Aug. 9, 1955  N. R. GUILBERT, JR  2,714,998

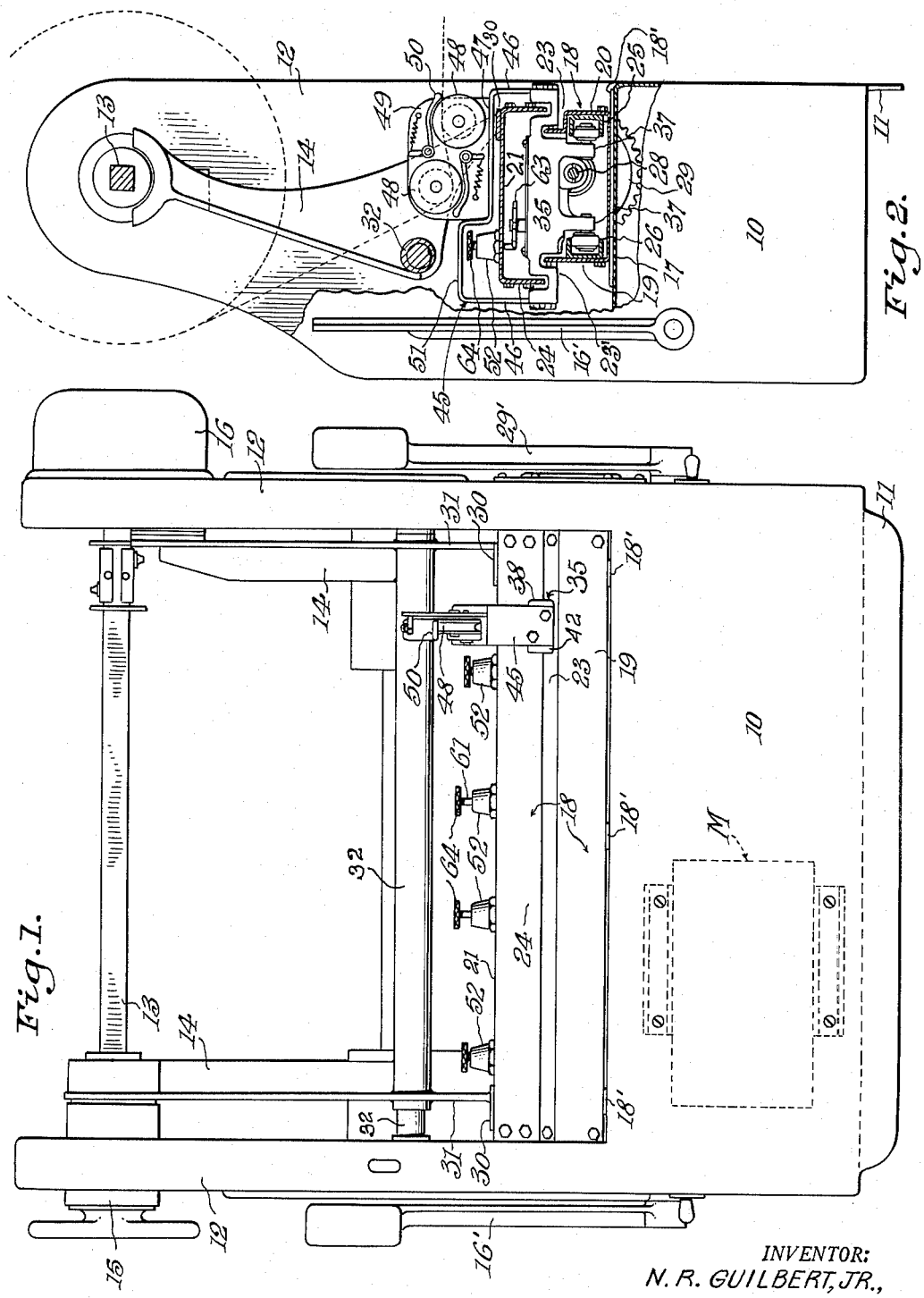

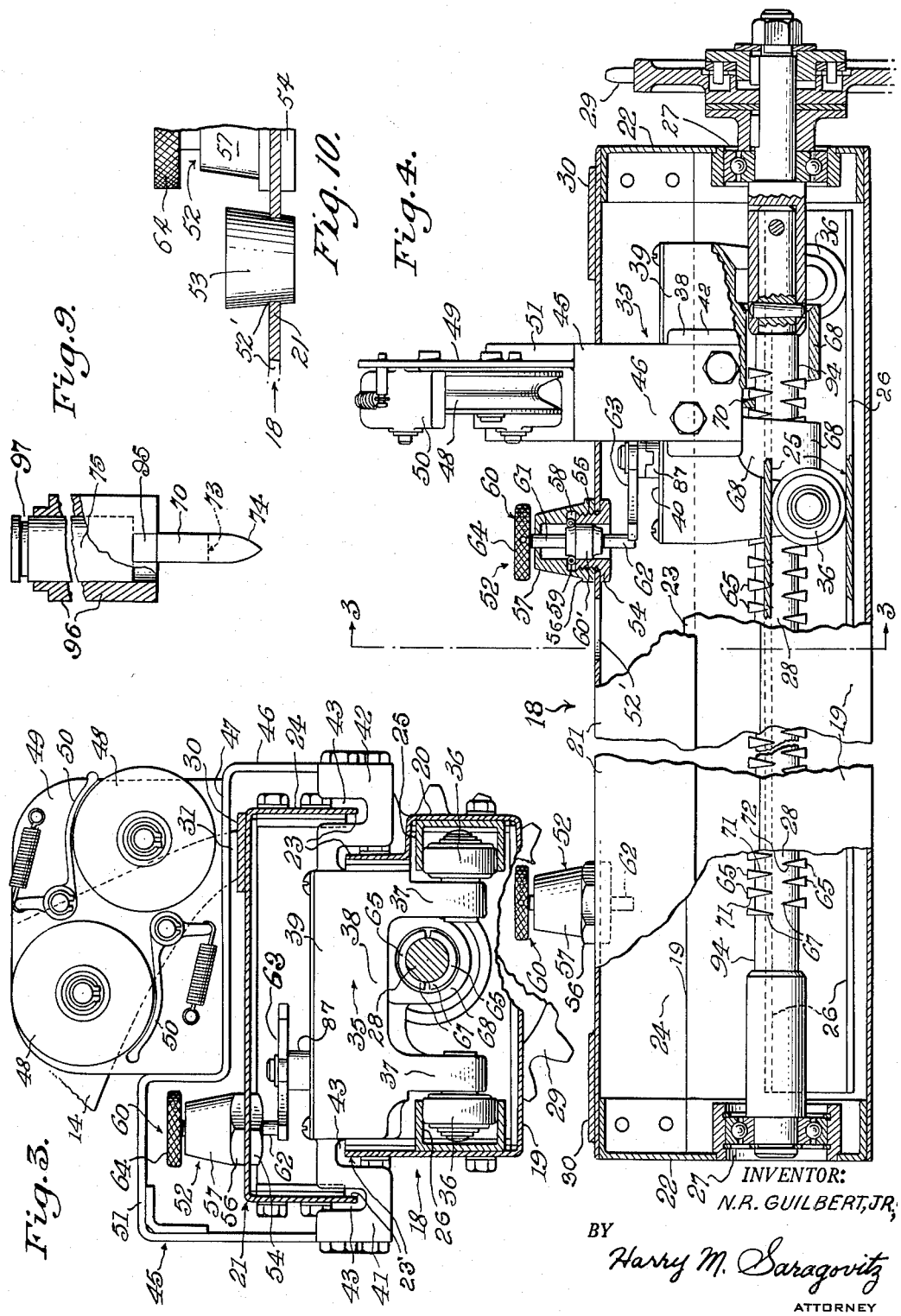

LEVEL WINDING MECHANISM

Filed June 26, 1952  4 Sheets-Sheet 4

INVENTOR:
N. R. GUILBERT, JR.,
BY
Harry M. Saragovitz
ATTORNEY

United States Patent Office 2,714,998
Patented Aug. 9, 1955

2,714,998

LEVEL WINDING MECHANISM

Nicholas R. Guilbert, Jr., Wyndmoor, Pa., assignor to the United States of America as represented by the Secretary of the Army Application June 26, 1952, Serial No. 295,677

7 Claims. (Cl. 242—158)

The invention relates to level wind mechanisms—that is to say, a thread or wire feeding device for reeling machines which will lay the thread or wire in close level series of turns as the wire or the like is reeled upon a spool.

The machine is useful for winding coils for transformers, magnets and other coil devices, and for reeling and unreeling communication wire laid in the field.

It is an object of the invention to present a complete reeling machine embodying the level wind feature, which will be well adapted to use in a portable unit especially suitable for military use in field service. In this use it is an important desideratum to embody the mechanism in an extremely simple and rugged form, readily adapted to be maintained, serviced and repaired with a minimum of shop equipment. Perhaps its more important requirement is such constructional form that it will be liable in a minimum degree to damage or derangement in the rough usage to which military equipment is subject. Another requirement which it is an aim of the invention to meet is the embodiment of the mechanism in such manner that it will be adapted to operate where dirt, sand and mud is being thrown about, with a minimum of impairment by such detritus.

A specific aim of the invention is to offer a novel mounting or guide for a carriage carrying a thread or wire feed and travelling along the frame of the machine parallel to the spool mandrel.

It is a further purpose to devise an improved and novel means for reversing the movement of a reciprocating carriage driven by a right and left worm from various points in its path, so as to accommodate the machine to reels or spools of various lengths. A related object is to offer a novel means for effecting the operation of a switch abutment, runner or vane in the worm groove between opposite positions for causing the movement of the carriage on which it is mounted in respective directions. It is particularly sought to assure prompt and certain completion of each shift movement after limited initial motion is imparted to the operating parts, so that the switch will not be liable to accidental return to a position from which it has been shifted. It is also an aim to present a novel construction of the two-way worm or screw and a novel coordination of a shiftable abutment therewith.

Another important aim of the invention is to provide a novel adjustable automatic reversing device for reversing the movement of the carriage by means of a switch abutment, runner, or vane, set in a double or two-way worm shaft, and to offer a stationary stop which may be variously positioned manually with great ease on the guideway along the path of the carriage and so operative that accurate positioning of the stop in relation to the intersections of the two-direction threads on the worm may be effected, to avoid jamming or breakage by untimely shift of the vane or switch.

In this respect it is proposed to so construct the reversing mechanism that the strike device may engage the shifting member early, and the necessary energy to operate the switch will be stored and applied yieldingly so that the switch may oppose the operating force if the switch is so engaged in one thread that it cannot at the moment be turned, but as soon as the switch is in the proper relation to the approaching thread intersection to permit its turning, the stored energy will immediately become effective to operate the switch as required.

Additional objects, advantages and features of the invention reside in the construction, arrangement, and combination of parts involved in the embodiment of the invention, as will become apparent from the following description and accompanying drawings, wherein:

Figure 1 is a rear elevation of a reeling machine in which my invention is embodied (in this figure the two intermediate stops 52 are shown in retracted position, while those near the ends of the guide are in projected or operative position, so that maximum travel of the carriage along the guide will be effected).

Figure 2 is a left side elevation partly broken away of the reeling machine;

Figure 3 is a cross section of the carriage guide and carriage, looking toward the right in Fig. 4;

Figure 4 is a rear view of the carriage and guide, partly in section;

Figure 9 is a detail of the abutment device;

Figure 10 is a cross section through the line of apertures in the channel piece.

Figure 5:
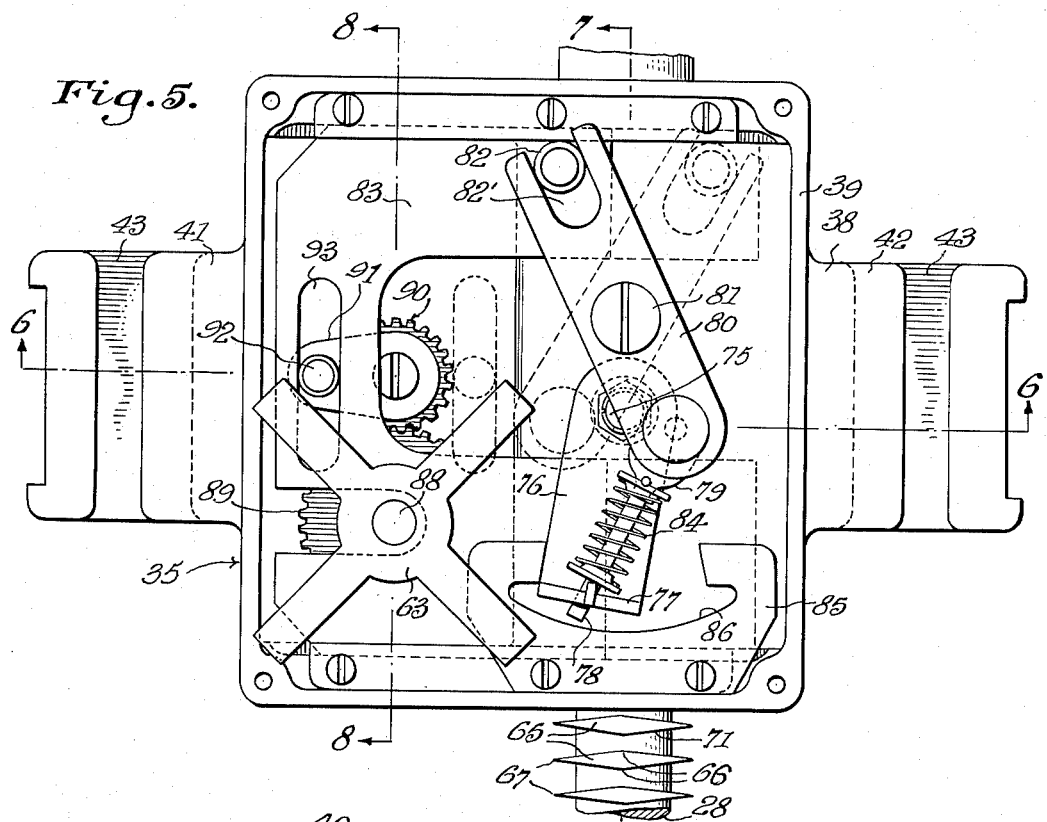
Figure 5 is a plan of the carriage with the cover plate removed.

Referring more particularly to the drawings, there is illustrated a portable reeling machine comprising a case 10, adapted to be set upon a table, plank or other simple flat support, the case having a depending flange 11 adapted to be set against the edge of such a support to stabilize and orient the machine. Conventional fastenings may be employed as required to secure the machine upon its support.

At each side of the case there are hollow standards 12, at the upper ends of which there is revoluble and releasably mounted a spindle or mandrel 13, which is shown as rectangular in cross section, and is adapted to be engaged in a spool or reel of conventional form suitable for reeling and unreeling wire, cable, or other strand. The spindle is supported in a tiltable frame 14 movable to and from operative position for utilization of a reel thereon, and the spindle is secured in the operative position between the standards by conventional bolt or other means 15 at the left side in Figure 1, and by a releasable or withdrawable driving connection 16 at the opposite side. In the form of machine heretofore known and largely used, but forming no novel part of the present invention the driving means includes a chain operating in the hollow standard at one side of the machine. In consequence, these fastenings and drive are not illustrated in the present disclosure. The mechanism may be operated by a motor M and gearing (not shown) in the case 10. A brake lever 16' is shown at the left side of Figure 1 by which feeding of wire from a reel on the machine may be controlled as is customary, the brake details being no novel feature of this application and therefore not illustrated.

The case 10 has a horizontal top plate 17 extending between the bases of the two standards 12, at the rear side of the machine, and upon this plate—extending the full length of the space between the standards—there is mounted a guide 18 of a special form. This is made essentially in two parts, a lower channel piece 19, having a vertical inner side while the outer or rearward side has an inset upper portion stopping at the same level as the inner side, there being thus formed a lateral longitudinal channel 20 in the lower part of this rearward side of the channel piece 19. The top of the guide consists of a simple broad channel piece 21, somewhat wider from front to rear than the bottom lower channel piece 19, and having vertical depending side flanges 24 of somewhat less altitude than the sides of the lower piece 19, but extending downwardly to a level slightly below the top edges of the sides of the lower piece 19. The two channel pieces are joined at their ends by suitable cross plates 22 secured thereto in a conventional way. The top channel piece extends in a forward direction beyond the lower piece 19 farther than it does rearwardly, so that a forward slot 23' is formed between the upper and lower channel flanges. Also, adjustable stops to be described may be mounted thereon close to the forward side of the path of a carriage to be described, travelling in the guide. On account of the inset of the upper rear side of the lower piece 19 a rear slot 23 is formed between the opposed channel flanges, throughout the length of the guide, the depending rear and outer flange 24 of the top channel piece 21 stopping a distance above the lateral channel 20.

In the channel 20 there is secured a stock U-section rail 25 with its side flanges horizontal and its bight secured to the vertical side of the channel 20. A similar rail 26 at the same level is secured to the forward side of the channel piece 19.

This guide as thus described constitutes a substantially tubular combined guide and housing unit removably mounted on the top plate 17 of the case 10 in any desired way, foot plates 18' being shown, welded to the channel piece 19 and bolted to the top plate 17, and, as will appear, serves as a protection for operating parts, the function of which parts would otherwise be undependable and in some cases completely blocked in field use. Ball bearings 27 are mounted on the end plates 22 supporting a right and left thread worm shaft 28 extending throughout the length of the guide. This shaft is extended through the end plate 22 at the right of Figure 1, and has mounted thereon within the lower part of the hollow standard 12 thereadjacent, a drive sprocket 29 and clutch mechanism by which the sprocket, constantly driven, may be clutched to the shaft at will. The details of the clutch and drive to the sprocket are not shown, since they are not a part of the invention to be herein claimed. However, a lever 29' is shown at the right hand end of the case 10 in Fig. 1, which may be a clutch operating means. A drive for the spindle 13 (not shown) may be incorporated in the case 10 and standard 12, so that the spindle is rotated in a proper ratio to rotation of the shaft 28.

The top channel section 21 of the guide 18 has wear plates 30 fixed thereon at each end, and the tilting frame 14 has forwardly extended foot pieces 31 which rest on respective wear plates when the frame 14 is at its rearward and normal operative position. The side pieces of the frame 14 are joined and fixed in rigid alignment by a cross bar 32 coincident with the pivotal axis of this frame.

Movable longitudinally in the guide 18, there is a carriage 35, of generally rectangular form in plan and having wheels or rollers 36 at its four corners of a diameter to fit loosely between the top and bottom flanges of the rails 25 and 26 so that the carriage is held securely in a properly oriented position with respect to the path which it is to travel in the guide. This path coincides with the axis of the shaft 28. These rollers are mounted on stub pins set in depending arms 37 formed integrally on a cast metal carriage frame piece 38. The frame comprises a central square case part 39 closed at the top by a cover plate 40. Forward and rearward horizontal bracket extensions 41—42 from this case part extend to a short distance outwardly beyond the depending flanges 24 of the top channel section of the guide. These extensions have deep grooves 43 therein aligned with and slightly wider than the thickness of the side flanges of the channel members of the guide, and the grooves receive freely therein respective flanges of the channel members.

The extensions 41—42 provide a footing for a bridge piece 45 on the carriage, without and above the guide and having forward and rearward depending legs 46 secured to vertical faces on the extremities of the extensions 41—42. This bridge comprises a strip of heavy sheet metal bent to form the legs 46, and a horizontal rearward major bight part 47 on which there is mounted a pair of tandem sheaves 48 revoluble on horizontal studs set in one side of a vertical planiform plate 49 welded to and extended upwardly from the horizontal rearward part 47 of the bridge, in a plane normal to the guide 18. The forwardly located sheave is mounted higher than the outer and rearwardly located one, and on the plate 49 there are pivoted spring-loaded keepers or guard levers 50 aligned with and above the sheaves and arranged so as to retain a wire in the sheaves, but each liftable manually to clear its sheave and permit emplacement or removal of a wire extended to or from a reel carried on the spindle 13. The approximate range of feed from the pulleys to and from such a reel is indicated in dotted lines in Figure 2, and it will be seen that the wire will always cross the plane common to the pivot axis of the frame 14 and the axis of the spindle 13, so that tension on the wire will hold the frame 14 in proper operative position, stabilizing the reel. The forward end of the bridge piece has a raised part 51 affording a space thereunder to accommodate and pass freely adjustable stops 52 mounted on top of the guide. These are strikes or strikers, used to engage a movable runner-shifting turntable member 63 on the carriage, so as to reverse the position of the runner and cause reversal of travel of the runner and carriage, as will be descibed.

To receive the stops 52, the top channel member 21 of the guide may be formed with a series of apertures 52' into one of which the stop member 52 may be set, or a slot (not shown) may be formed over a major part of the length of the guide, stopping short of the ends of the latter, in which the stops 52 may be set so as to be slidable until the material of the guide is clamped in the stop. In the event that a slot is utilized, means to close unused portions of the slot would be desirable.

As illustrated, the stops are indicated as set in apertures 52', which may be spaced to correspond to the standard widths of reels which are likely to be used on the machine. Where apertures are used, plugs 53 may be used to close those not in use. The length of the machine may be greatly varied, according to the uses for which it is intended, and if necessary it may be several multiples of the length illustrated, in relation to the diameter of spool, mandrel, or other work upon which strands, thread, cord, cable, or wire is to be wound.

Each stop 52 comprises a shell having a hexagonal bottom piece 54 having a threaded boss 55 on its upper side inserted from below through the proper aperture in the web of the channel piece 21, and upon this boss there is screwed a top piece 56 having a hexagonal base and a bonnet portion 57 in conical form. The boss 55 is of such length, and the threaded socket in the top piece 56 is of such depth that when the two are screwed together against an interposed portion of the channel material, a space 58 remains over the boss within which a garter spring 59 may be freely accommodated. The stop proper consists of a plunger 60 having a central body part 60' of large diameter slidable vertically in a suitable bore in the top and bottom parts of the shell, and having upper and lower stems 61 and 62 engaged slidably through reduced openings in the top and bottom pieces of the shell. The body part 60' is sufficiently shorter than the bore in the shell part to move alternately above and below the garter spring, which has its inner part in the path of the body, so that when the plunger is moved from either extreme of its movement, the spring is engaged and expanded by the body part 60', moving the spring radially into the space 58, and when the movement is completed the spring contracts again into the path of the body, holding the plunger yieldingly at the limit of its movement. The body part 60' is rabbeted at top and bottom to form shoulders, which remain in alignment with the spring 59 and limit its contraction when the plunger is at the limits of its movement, so that the spring is kept concentrically arranged in the stop device.

When the plunger is at its lower position, the stem 62 projects a distance below the bottom piece 54 into the space within the guide 18, so as to engage a turnstile arm or star wheel member 63 of a reversing mechanism carried by the carriage. Each plunger has a hand knob 64 by which it may be raised or lowered.

The reversing mechanism includes a special construction of double worm form of the threads or helical channel elements on the shaft 28. In this instance, each segment of the separating land material 65 between the channels is diamond shaped, these segments being in two diametrically opposite longitudinal series on the shaft, and it will be noted that lands 65 at opposite sides of the shaft are not aligned, but are in staggered relation, and their mutually adjacent opposed end point portions 67 are not in lapped relation, but are separated from a common longitudinal line on the shaft by a small angle. In addition, the mutually adjacent opposed sides of lands at the same side of the shaft are not parallel to fit both sides of the runner, abutment or switch device which is to travel in the worm channels, but are divergent, so as to form respective distant or opposite sides of divergent helical paths in which the runner may travel alternately. Also, as will appear, the runner or abutment 70 which is used in this device is constructed in such manner that instead of being locked by the lands in a given direction after being once set, it is free to be turned or shifted by the reversing mechanism from one path to the other whenever it is symmetrically positioned between two like lands at one side of the shaft. This construction is also such that the runner cannot be turned at other parts of the relative movement of the runner and lands incident to rotation of the shaft. It will be seen (Fig. 5) that from the mid points 66 of mutually adjacent lands in one longitudinal series their sides diverge at an angle which is the sum of the angles of the two pitches involved in the right and left threads, which may be equal and opposite. The end points 67 of the lands are correspondingly formed, their sides meeting at an acute angle of the same angular value as last named. The space between the mutually adjacent mid points 66 of the lands is sufficient to permit pivotal movement of a vane, runner, switch or abutment 70 carried by the carriage 35, from alignment with one feed path on the shaft to the alternate one, so that at one position of the runner on its pivot, when the shaft is rotated the runner abutment will be propelled in one direction, and at the alternate position it will be propelled in the opposite direction longitudinally of the guide.

The carriage frame 38 has formed thereon a bearing 68 at its lower side, bored to receive the shaft 28 revolubly.

Figure 7:
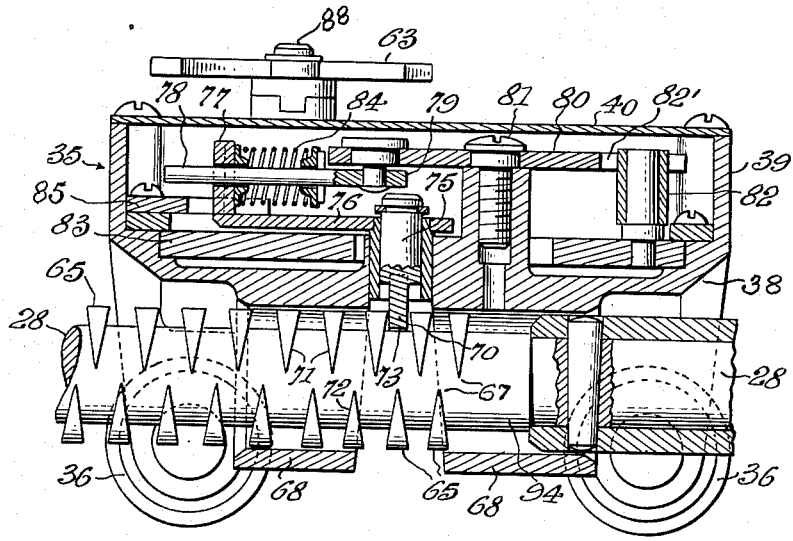
Figure 7 is a vertical longitudinal section of the carriage on the line 7—7 of Fig. 5.
Figure 8:
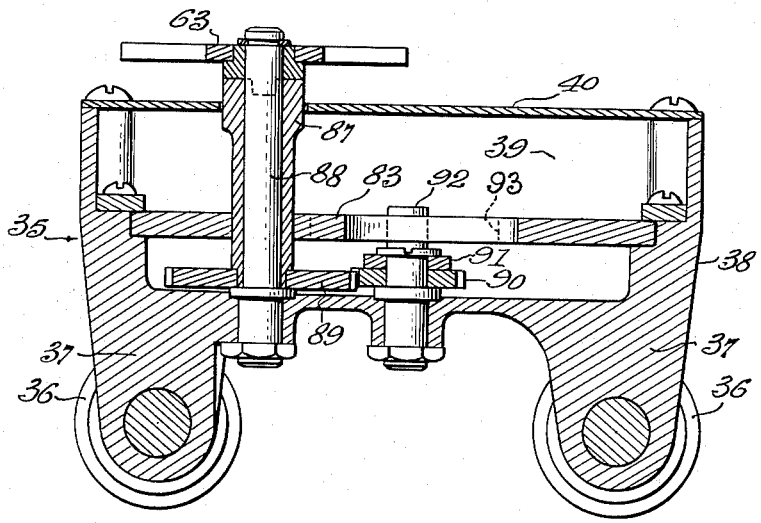
Figure 8 is a vertical section on the line 8—8 of Fig. 5.

The abutment 70 comprises a hardened metal body shaped in cross section with vertical sides to fit between the wall 71 of one land and the opposite wall 72 of a land at the opposite side of the shaft, as indicated in Fig. 7. It has a bottom face 73 which is curved to fit partly around the body of the shaft at the bottom of the grooves, and its length is sufficient to span an arc of approximately 150 degrees around the shaft. The ends of the abutment are tapered to an ogive form 74, which will obviate engagement with advancing points of lands in case of delayed operation of the abutment in its switching action. The abutment is formed with a stem 75 mounted revolubly in the carriage frame and extending into the case portion 39 of the frame, where a bracket crank arm 76 is fixed thereon formed as a horizontal plate having its outer end turned upward to form a thrust flange 77, and apertured to receive slidably therethrough the free end of a toggle lever or pin 78. This lever is formed with an eye 79 at its opposite end which is pivoted to the end of a horizontally oscillatable rocker lever 80 of the first order pivoted at its middle on a post on the case bottom as at 81. The other end of the lever 80 is longitudinally slotted and receives therein a vertical wiper pin 82 by which the lever 80 is operated.

The pin 82 is fixed as a stud in a horizontal reciprocable plate 83 slidably mounted in the bottom of the space within the case 39 for movement transversely of the carriage so that on full stroke movement of the plate the pin will move the lever 80 through an arc of approximately 50 degress, more or less. A helical wire compression spring 84 is engaged loosely around the toggle lever 78 between the thrust flange 77 and the eye 79, so that the spring will act by expansion to tend to move and hold the crank arm 76 and adjacent end of lever 80 at opposite limits of their movements alternately. The relation of the parts is such that when the coengaged ends of the toggle lever 78 and rocking lever 80 are at one limit of their movement, the opposite end of the toggle lever and the crank arm 76 are at an opposite extreme of their movements. The movement of the crank 76 is limited by a horizontal stop plate 85 secured to the case, just above the level of the body of the crank 76, and having an arcuate slot 86 therein the ends of which will be engaged by the lateral edges of the flange 77 at respective limits of swing of the crank 76. It will be noted that the swing of the crank 76 is symmetrical with respect to a line transverse to the path of reciprocation of the plate 83 and that with the crank 76 at either limit of its movement, a full stroke movement of the lever 80 will move the toggle lever past dead center relation between the two (crank 76 and lever 80) sufficiently for the spring to exert a thrust against the crank 76 which will tend to move it toward the opposite limit of its movement, and will do so when the abutment is free. A corresponding movement of the switch abutment will thereby be effected, and the movement of the crank 76 is limited by the stop plate to those positions in which the abutment will be aligned with one worm groove of the shaft 28 or the other. It will also be appreciated that if the abutment happens to be positioned across the line between the points 67 of lands at opposite sides of the shaft, the force of the spring may be opposed by the engagement of the abutment against the lands until the mid points 66 of one set of lands have approached close to, or have reached, a position midway of the abutment, when the spring may complete the movement required to effect a switch of direction of the abutment.

Movement of the plate 83 in its reciprocation is effected by means of the turnstile device 63 before mentioned, which consists of a cross, its four radial quadrate arms of equal length arranged to rotate horizontally at a level slightly above that of the lower end of the stem 62 of the plunger 60 of the stop 52 when the knob 64 is depressed. The member 63 has a hub 87 engaged revolubly around a vertical stud 88 set in the bottom of the case 39. Fixed on the lower end of the hub there is a large gear 89 meshed with a smaller gear 90 on the case, the latter having a crank 91 provided with an upstanding wiper 92 set loosely in a straight slot 93 in the plate 83. This slot is arranged transversely to the direction of movement of the plate in its operation of the toggle-switch device previously described, and the crank on the gear 90 is normally on a radius of the gear at right angles to the slot 93. It will be apparent that the action of the toggle spring 84 in holding the immediately associated parts in their extreme positions will also act to hold the plate 83 at its corresponding limits of movement, by reason of the pin 82 being engaged in the slotted end of the rocker lever 80. The turnstile will consequently also tend to be thereby held in a position in its rotation shown in Figure 5, because of engagement of the wiper pin 82 by the sides of the slot 93. The ratio of the gears 89 and 90 is approximately 2 to 1.

It should be noted that the axis of the turnstile is sufficiently displaced from a line on the guide 18 including the plunger 60, so that as the carriage moves along the guide, if the stem 62 is depressed it will engage and cam an arm of the turnstile near the end of the arm, so as to turn the cross member. The normal position of the latter with the parts of the reversing mechanism at either limit of their movement is as shown in Figure 5, the arms of the turnstile being extended at an angle of approximately 45 degrees to a line longitudinally of the guide 18. After the arm has been moved through an angle of approximately forty-five degrees, or one-eighth of a turn of the turnstile, the toggle mechanism will have passed its dead center relation and will operate to complete a full stroke operation of the plate 83, and, in turn, by the cam action of the slot 93, complete movement of the arm 91 through 180 degrees, and the turnstile through 90 degrees, or a quarter turn. The rocker lever 80 at the same time shifts the direction of the toggle spring so that it reacts against the crank arm 76 to swing the latter and perform a full shift of the abutment 70 from alignment with the helix angle of one thread on the shaft to alignment with the helix angle of the thread of opposite pitch. This movement of the abutment extends over only about fifteen degrees around the axis of its stem 75. This movement will immediately reverse the direction of movement of the carriage, as the thread segments or lands 65 press against the opposite side of the abutment thereafter. This reversal will occur within less than a quarter turn of the shaft 28 after throw of the abutment to its new position. By properly positioning the stop 52 in relation to the lands on the shaft 28, the switch movement of the abutment may be caused to take place while the mid angles 66 of the lands are beside the abutment, and the latter is free to immediately rotate on its stem from one helix angle to the other.

After the carriage begins reversed movement, the stem 62 will have progressive change of position relative to the moving carriage corresponding to movement of the stem 62 backwardly from the turnstile arm which it had engaged. In this relative movement, the cam arm of the turnstile which followed the one engaged by the stem 62 will thereby have been interposed in the return path of the relative movement of the pin and carriage. It will therefore be engaged by the stem 62 and moved in a direction the reverse of that which effected shift of the abutment. However, as the second arm is inclined in the general direction of relative movement of the stem 62, the latter will soon clear the end of the arm after only a small reverse movement of the turnstile, and such movement will be insufficient to move the gear 90 and crank 91 enough to return the toggle lever and spring across their dead center position. After the stem 62 has thus cleared the end of the turnstile arm the tension in the toggle spring, reacts on the rocker lever 80 to restore it and the sliding plate 83 to their limit positions from which they had been momentarily displaced, holding the mechanism in its shifted position.

While a complete four-armed cross has been shown on the turnstile this is done for convenience in assembly and repair of the apparatus, because orienting of the turnstile will not be required, since with any two arms projected across the line on which the stops are located, the sliding plate 83 will be at one limit or the other of its movement and propulsive action of the shaft 28 on the runner or abutment will have the effect of moving the carriage in such direction that a stop in the direction of such movement will engage and operate one arm so as to reverse the position of the abutment and movement of the carriage.

Actually only one arm is essential, because after operation of one arm by a stop 52, the same arm will be in position to be intercepted by the stop at the opposite limit of travel of the carriage, and will be so engaged by the reversed travel first effected. This second engagement by the opposite stop will return the single arm to its original position when first engaged, with a like operation of the reversing mechanism, the gears 89 and 90 having a movement the reverse of that involved on the first operation. It will therefore be understood that the invention is not limited to a turnstile with more than one arm unless specifically so defined in the claims.

It will be noted that the lands are omitted on the shaft 28 for a distance at each end of the shaft, within the range of movement of the abutment with the carriage, thus affording a space 94 in which the abutment 70 may lie at times without propulsion of the carriage in either direction. Thereby, at any time that it is desired to discontinue use of the carriage and guide, it is only necessary to raise the stop 52 at the end where it is desired to allow the carriage to rest, and as the abutment approaches and moves into the space 94, engagement of the lands therewith is discontinued and the carriage remains stationary. This will permit rapid unreeling of a strand from the device without operating the carriage 35, and without using the sheaves 48.

Figure 6:
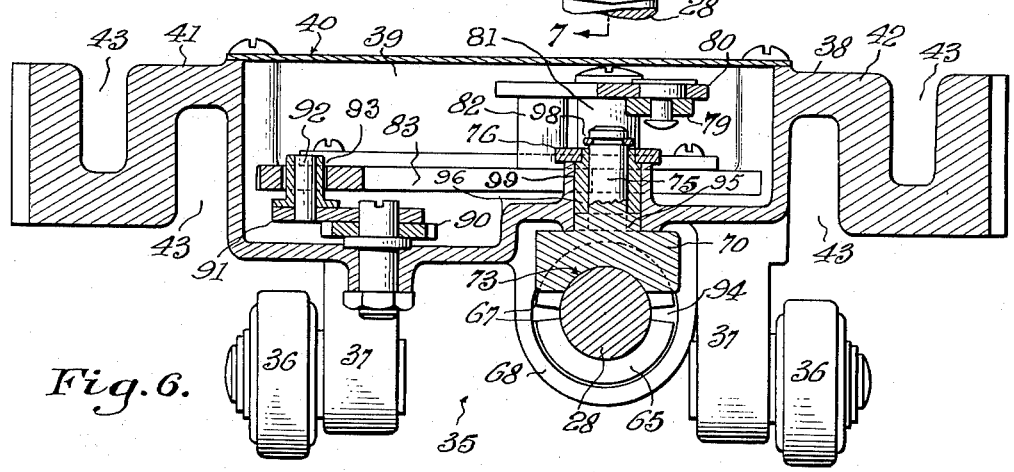
Figure 6 is a cross section of the carriage on the line 6—6 of Fig. 5.

It should be noted that the abutment is made in a novel way permitting quick detachment and renewal of the wearing part or body 70 without renewing or disconnecting the arm 76, and providing for accurate orientation of the body. For this purpose the body 70 is formed as a substantially flat thin plate or shoe having the conformation before described for fitting the shaft 28 and lands. Its cylindrical stem 75 is formed integrally thereon and has lugs 95 formed at opposite sides as continuations of the shoe beside the stem above the horizontal top edge of the latter. Fitted around the stem 75 and in effect forming part thereof, there is a sleeve 96 notched at its lower end to receive the lugs 95 so as to key the shoe to the sleeve. In Figure 6 the sleeve has a crank arm 76 permanently welded or otherwise secured thereto. The stem 75 extends above the upper end of the sleeve 96, where it is formed with an encircling groove 97 closely over the end of the sleeve. A C-spring 98 is removably sprung into the groove, being shaped so as to project from the groove over the sleeve and so prevent withdrawal of the stem 75 from the sleeve. The crank projects beyond the bearing bore 99 in the bottom of the case 39. Consequently the shoe remains keyed to the sleeve and crank 76 and the parts are retained in such keyed relation and in the bearing as long as the C-spring is in place.

The invention is not limited to the exact structural forms illustrated, and it will be understood that various modifications of construction, arrangement and combinations of parts are included within the spirit and scope of the invention except as may be specifically defined in the appended claims.

It may be seen from the foregoing description that in furtherance of the object before stated, of a mud-proof and dirt-proof mechanism, the form of the guide is such as to serve as a housing for operative carriage and stop parts especially liable to impairment by detritus and especially from flying stones and gravel, and spattering mud.

It will also be apparent that the construction of the stops 52 and reversing means in the carriage are peculiarly cooperative toward the last mentioned object while at the same time attaining the object stated above, viz—quick accommodation to various widths of reels—which is important where many kinds of wire, cable, etc., are used, as in military communications maintenance. The complete inclosure of the mechanism within the case 39 of the carriage is coordinated with the strike device 52 and case-like guide or track 18 with such construction that there is a minimum liability of impairment of function of the apparatus by accumulation of dust or even thin mud within the guide, which at all times is effective as guide and guard. When the reel is mounted on a truck travelling over rough terrain, throwing up mud and gravel, the parts within the guide are completely shielded and protected from access of jamming material. The reel, ordinarily mounted on the rear of a truck, may be operated during travel of the truck, as is sometimes necessary. The qualities indicated are important in cases where a truck upsets, or backs into a mud bank, or is submerged in a flood; and military necessity requires prompt operation of the device after restoration of the truck to operative condition, without waiting for cleaning of the reeling apparatus.

I claim:

1. In a reeling and unreeling machine for field use with wire and the like, a reel support, a reel spindle thereon, means to rotate the spindle, a combined guide and housing parallel to the axis of the spindle, a two-way worm shaft arranged longitudinally within the guide operatively connected to the spindle, a carriage mounted to travel within the guide, said guide comprising a tube-like track enclosing the carriage and having at least one longitudinal downwardly opening slot, said carriage having an extension through the slot, strand-guiding means on the said extension constructed to receive a strand from a remote supply and to guide the same toward said reel spindle, an abutment runner on the carriage engaged with the worm shaft and pivotally movable to change its direction, said runner having a length to extend a distance in alignment with either helix angle of the worm shaft and being pivotally movable to change its position from one helix angle of the worm shaft to the other helix angle of the worm shaft, a plurality of stop devices spaced longitudinally on the guide, each having a retractable stop part within the guide and a manual operating part external to the guide operable at will to retract said stop part, and reversing means on the carriage to shift the angular position of the runner relative to the shaft and having a part external to the carriage but within said guide to engage an unretracted stop in the path of said reversing means under movement of the carriage beside such stop and operable by said stop under relative movement of the carriage and stop device to move the abutment runner from one helix angle position to the other.

2. The structure of claim 1 wherein said guide comprises upper and lower opposed horizontal channel members substantially U-shaped in cross section, the upper channel member being inverted and wider than the lower one, said carriage being movable in the space between the channel members, arms extended from the carriage between the sides of the channel members and therewithout, a bridge piece mounted on said arms and over the guide, and strand guide means mounted on said bridge piece.

3. The structure of claim 2 wherein the side flanges of the upper channel member are extended below the upper edges of the lower channel member and spaced outwardly thereof, said extensions from the carriage being extended over the sides of the lower channel member, downwardly between the sides of the two channel members and outwardly from the guide.

4. A guide and travelling carriage for machines comprising two opposed generally U-shaped channel members having their side flanges extended toward each other to enclose a space therebetween, the sum of the dimensions of said flanges normal to their connected web parts being greater than the distance between the webs, said flanges being transversely offset from each other to form a slot therebetween at each side of the guide, rails at each side of the guide substantially U-shaped in cross section and having their bight parts secured to the flanges of one of the channel members, a carriage within the guide having rollers fitted in respective rails in number and position to prevent rotation of the carriage on vertical and horizontal axes, members joining the ends of the channel members, said carriage having at least one extension therefrom laterally from the guide, said extension being convoluted to pass over and under the inner and outer opposite flanges of the channel members for supporting material externally of said guide.

5. In a double-worm feed screw-operated traversing carriage reeling device, a carriage-moving runner revolubly mounted on the carriage fitted to the screw on an axis radial to the screw and rotatable from alignment with one pitch of the screw to alignment with the other pitch of the screw, a crank on the runner, a lever pivoted on the carriage in line with a medial position of said crank, an extensile toggle spring element pivoted to the free end of said crank and to a swinging part of the lever to hold the lever yieldingly at each limit of its movement, a full stroke device on the carriage engaged with the said lever to move the latter from one limit of swing toward the other on each operation of said full stroke device, strike-operated means on the carriage to operate the full-stroke device, and separately mounted stationary strike devices arranged to engage the strike-operated means under relative movement of the carriage and strike device adjacent predetermined limits of carriage travel.

6. In a traverse mechanism for reeling machines comprising a guide, a carriage element mounted to travel on the guide, a double-worm shaft revolubly mounted parallel to the path of the carriage on the guide, and a runner on the carriage fitted to the shaft and pivoted to align with either worm of the shaft; a crank arm on the runner radial to its pivot, a lever pivoted on the carriage, its pivot in line with a medial position of said crank, a toggle spring device pivoted to the free end of said crank and to an end of the lever, a cam plate slidable on the carriage in a plane parallel to the path of the lever and in a path transverse to the radius of said medial position of the crank, operative connection between the lever and said plate for oscillation of the lever under sliding movement of the plate, a turntable device on the carriage operatively connected to the said cam plate to move the plate a full stroke on limited operation of the turntable device, said turntable device having at least one arm located without the carriage and extending across a line coincident with the direction of travel of the carriage, and a stationary stop fixed beside the path of the carriage to intercept said arm, and operate the same through its said limited operation under relative movement of the carriage.

7. The structure of claim 6 wherein said connection between the turntable device and cam plate comprises a large gear concentric with and fixed with the turntable element of the turntable device, a small gear meshed with the first-named gear and having a crank fixed therewith, a wrist device on the crank, said plate having a slot therein transverse to the path of movement of the plate, said wrist device engaged in said slot to reciprocate the plate under rotation of said small gear.

References Cited in the file of this patent

UNITED STATES PATENTS

| 465,282 | Miller | Dec. 5, 1891 |
| 484,360 | Gawley | Oct. 11, 1892 |
| 1,245,876 | Connolly | Nov. 6, 1917 |
| 1,875,467 | Knoerzer | Sept. 6, 1932 |
| 2,134,369 | Merwin | Oct. 25, 1938 |
| 2,202,053 | Helmond | May 28, 1940 |
| 2,410,719 | Crossman | Nov. 5, 1946 |
| 2,444,432 | Eckert | July 6, 1948 |
| 2,451,730 | Greenlee | Oct. 19, 1948 |
| 2,539,667 | King | Jan. 30, 1951 |
| 2,544,143 | Dunn | Mar. 6, 1951 |